(12) United States Patent
Yu et al.

(10) Patent No.: US 6,694,310 B1
(45) Date of Patent: Feb. 17, 2004

(54) DATA FLOW PLAN OPTIMIZER

(75) Inventors: Tsae-Feng Yu, Nashua, NH (US); Anil D'silva, Nashua, NH (US); Jay W. Davison, Amherst, NH (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/489,403

(22) Filed: Jan. 21, 2000

(51) Int. Cl.$^7$ ............................................... G06F 17/30
(52) U.S. Cl. ................................ 707/4; 707/2; 707/10; 707/101; 707/102; 707/103 Y; 717/136; 717/137; 717/155; 717/156
(58) Field of Search ................................ 707/101–104, 707/1–10, 200–206, 103 Y; 717/136, 137, 155, 156

(56) References Cited

U.S. PATENT DOCUMENTS 6,212,524 B1 * 4/2001 Weissman et al. .......... 707/101
6,339,769 B1 * 1/2002 Cochrane et al.

OTHER PUBLICATIONS

Wayne W. Eckerson, *Next Generation Data Marts*, Patricia Seybold Group, Nov. 1997.
Colin J. White, *Building a Corporate Information System: the Role of the Data Mart*, Database Associates Internationl, Feb. 1997, see in particular pp. 10–15.

Petkovic et al., New Features for Query Processing, Jun. 1999, <http://www.sqlmag.com/Articles/Index.cfm?ArticleID=5439>.*

* cited by examiner

*Primary Examiner*—Kim Vu
*Assistant Examiner*—Hung Pham
(74) *Attorney, Agent, or Firm*—Gordon E. Nelson

(57) ABSTRACT

An optimizer for a data transformation system. The optimizer optimizes data flow plans that describe how data is to be transformed from the form it has in a data source to the form required in a data destination. A data flow plan is made up of a sequence of transforms, and the optimized data flow plan is equivalent to the original data flow plan but has fewer transforms. One kind of optimization is read/write optimization, in which the data flow plan is modified so that operations of the original data flow plan are performed in the data source or destination. Another is merge optimization, in which a single merge transform specifies the operations specified in a plurality of the transforms of the original data flow plan. The operations specified in the merge transform can further be performed in parallel. The optimizer additionally reorders the transforms in the original data flow plan to increase the amount of optimization. Operation of the optimizer is transparent to the user of the data transformation system.

42 Claims, 17 Drawing Sheets

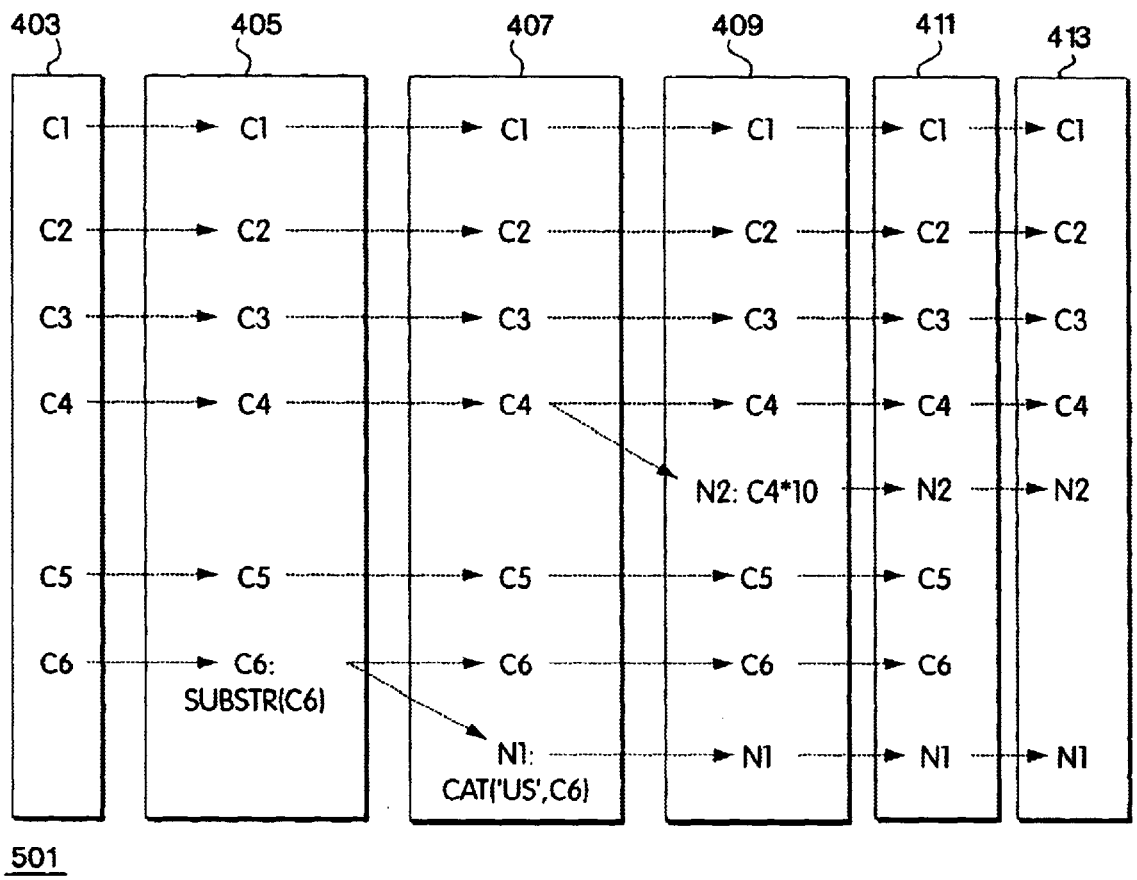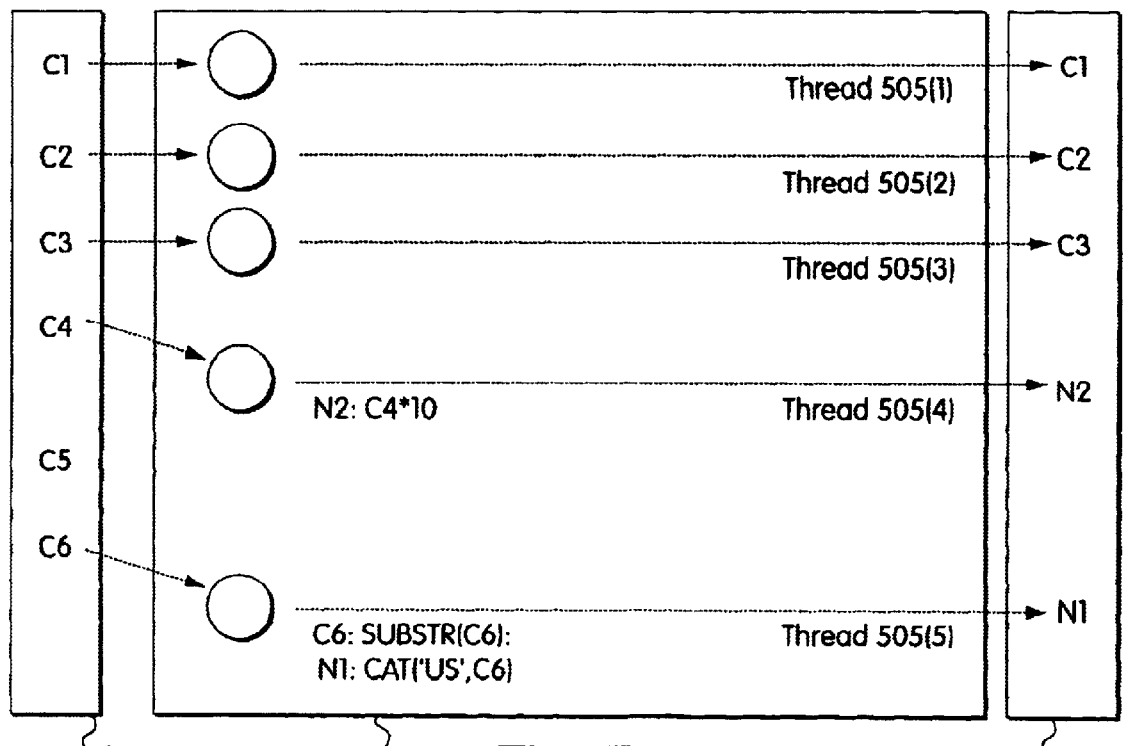
Fig. 5

| | | |
|---|---|---|
| Join | Join two branches of input data flow and generate an output data flow with the join result | WHERE table1.cloumn1 = table2.column2... Example: Where "T1","C1"= "T2,"C2" |
| Key Lookup | The input table (data flow) looking up a table in the database by matching some columns in both tables. If matched, the value in a column in the lookup table is written in the input table | SELECT lookup_column FROM table1, table2 Where table1.Key1=table2.key2(+) |
| Union | Combine two branches of input data flow. The two branches should have identical column specifications | 1. UNION ALL does not remove duplicate records; UNION removes duplicates. SELECT c1,c2,c3 FROM table 1 UNION ALL SELECT c1,c2,c3 FROM table2; |
| Time Lookup | Convert a column of daytime type to generate one or more columns (up to four) columns with Julian time values | Use Date and String conversion functions (i.e., TO_CHAR, ect.) |
| Disk Sort | Sort a larger number of input data that cannot fit in main memory | ORDER BY column1 ASC, column2 DESC,... |
| Memory Sort | Sort a smaller number input data that fits in main memory | ORDER BY column1 ASC, column2 DESC,... |

Fig. 8B

| | Column Name | Operation | To output |
|---|---|---|---|
| 907 | VEHICLE_ID_NUM | "MY ADMIN","CLAIM","VEHICLE_ID_NUM" | 1 |
| | CLAIM_NUM | "MY ADMIN","CLAIM","CLAIM_NUM" | 1 |
| | CLAIM_PROCESSOR | "MY ADMIN","CLAIM","CLAIM_PROCESSOR" | 1 |
| | VEHICLE_AGE | "MY ADMIN","CLAIM","VEHICLE_AGE" | 1 |
| | VEHICLE_MAKE | "MY ADMIN","CLAIM","VEHICLE_MAKE" | 1 |

| | Column Name | Column Name | To output |
|---|---|---|---|
| 909 | VEHICLE_ID_NUM | "MY ADMIN","CLAIM","VEHICLE_ID_NUM" | 1 |
| | CLAIM_NUM | "MY ADMIN","CLAIM","CLAIM_NUM" | 1 |
| | CLAIM_PROCESSOR | "MY ADMIN","CLAIM","CLAIM_PROCESSOR" | 1 |
| | VEHICLE_AGE | "MY ADMIN","CLAIM","VEHICLE_AGE" | 1 |
| | VEHICLE_MAKE | "MY ADMIN","CLAIM","VEHICLE_MAKE" | 1 |
| | AAA | | |

Step 3: Column Select: Unselect column "VEHICLE_MAKE"

| | Column Name | Column Name | To output |
|---|---|---|---|
| 911 | VEHICLE_ID_NUM | "MY ADMIN","CLAIM","VEHICLE_ID_NUM" | 1 |
| | CLAIM_NUM | "MY ADMIN","CLAIM","CLAIM_NUM" | 1 |
| | CLAIM_PROCESSOR | "MY ADMIN","CLAIM","CLAIM_PROCESSOR" | 1 |
| | VEHICLE_AGE | "MY ADMIN","CLAIM","VEHICLE_AGE" | 1 |
| | AAA | | 1 |

Step 4: Concatenation concate 'NH' with VEHICLE_ID_NUM to write into AAA

| | Column Name | Column Name | To output |
|---|---|---|---|
| 913 | VEHICLE_ID_NUM | VEHICLE_ID_NUM | 1 |
| | CLAIM_NUM | CLAIM_NUM | 1 |
| | CLAIM_PROCESSOR | CLAIM_PROCESSOR | 1 |
| | VEHICLE_AGE | VEHICLE_AGE | 1 |
| | AAA | T | 1 |

Step 5: Filter: Filter out records based on the condition "VEHICLE_AGE"<3

| | Column Name | Column Name | To output |
|---|---|---|---|
| 915 | VEHICLE_ID_NUM | VEHICLE_ID_NUM | 1 |
| | CLAIM_NUM | CLAIM_NUM | 1 |
| | CLAIM_PROCESSOR | CLAIM_PROCESSOR | 1 |
| | VEHICLE_AGE | VEHICLE_AGE | 1 |
| | AAA | concat('NH',VEHICLE_ID_NUM) | 1 |

| | Where clause |
|---|---|
| 917 | VEHICLE_AGE<3 |

Fig. 9A

Step 8: Substring: Keeps the first 10 characters of the data in the column "NH_VID"

| Column Name | Operation | To output |
|---|---|---|
| VEHICLE_ID_NUM | replace("MY ADMIN","CLAIM"."VEHICLE_ID_NUM",'4V','US') | 1 |
| CLAIM_NUM | "MY ADMIN","CLAIM","CLAIM_NUM" | 1 |
| CLAIM_PROCESSOR | "MY ADMIN","CLAIM","CLAIM_PROCESSOR" | 1 |
| VEHICLE_AGE | "MY ADMIN","CLAIM","VEHICLE_AGE" | 1 |
| NH_VID | substr(concat('NH',VEHICLE_ID_NUM),1,10) | 1 |
| REC_NO | ROWNUM | 1 |

925 → rows 1–2; 910 → whole table

| Where clause |
|---|
| VEHICLE_AGE<3 |

1003 → SELECT
1009 {
    replace ("MY ADMIN"."CLAIM"."VEHICLE_ID_NUM",'4V','US')
        "VEHICLE_ID_NUM",
    "MY ADMIN"."CLAIM_NUM" "CLAIM_NUM",
    "MY ADMIN"."CLAIM","CLAIM_PROCESSOR" "CLAIM_PROCESSOR"
    "MY ADMIN"."CLAIM"."VEHICLE_AGE",
    substr (concat('NH,"MY ADMIN"."CLAIM"."VEHICLE_ID_NUM"),
        1,10) "NH_VID",
    ROWNUM "REC_NO"
}

1003 → FROM
    "MY ADMIN"."CLAIM"

1007 → WHERE
    "MY ADMIN"."CLAIM"."VEHICLE_AGE"<3

```
// A Plan has multiple Intermediate Transforms
for each Intermediate Transform in the plan
{
    while the next Transform is not a Sink Transform
    {
        move the cursor to the next Transform
        if both the current and the next transform can merge
        then
        {
            initialize a Data Table to record the operation
                information of the current Transform
            remove the current Transform from the plan
        }
        while the next Transform can merge'
        {
            move the cursor to that Transform
            fetch the operation information from the
                Transform
            update the Data Table based on the Transform
                operation information
            remove the Transform Step from the Plan
            get the next Transform
        } create an internal Merge Transform based on the
            Data Table
        insert the Merge Transform before the current
            Transform
    }
    }
    move to the next Intermediate Transform
}
```

- 1103 encompasses the outermost block
- 1105 encompasses the "while the next Transform is not a Sink Transform" block
- 1107 encompasses the inner "while the next Transform can merge" block
- 1109 encompasses the "if both the current and the next transform can merge" block
- 1111 encompasses the "create an internal Merge Transform" block

Fig. 11

Step 1: Flat Source Transform where Data Table is Initialized as:
SELECT

1201

| Column Name | OPERATIONS |
|---|---|
| C1 | C1 |
| C2 | C2 |
| C3 | C3 |
| C4 | C4 |
| C5 | C5 |
| C6 | C6 |

1207

1203   1205

Step 2: Substring Transform where Data Table is Updated as:
SELECT

1209

| Column Name | OPERATIONS |
|---|---|
| C1 | C1 |
| C2 | C2 |
| C3 | C3 |
| C4 | C4 |
| C5 | C5 |
| C6 | Substring (C6, 1, 10) |

1211

Step 3: Concatenation Transform where Data Table is Updated as:
SELECT

1213

| Column Name | OPERATIONS |
|---|---|
| C1 | C1 |
| C2 | C2 |
| C3 | C3 |
| C4 | C4 |
| C5 | C5 |
| C6 | Substring (C6, 1, 10) |
| N1 | Concat ('US', Substring (C6, 1, 10)) |

1215

Step 4: Expression Calculator Transform where Data Table is updated as:
SELECT

1217

| Column Name | OPERATIONS |
|---|---|
| C1 | C1 |
| C2 | C2 |
| C3 | C3 |
| C4 | C4 |
| C5 | C5 |
| C6 | Substring (C6, 1, 10) |
| N1 | Concat ('US', Substring (C6, 1, 10)) |
| N2 | C4*10 |

1219

210

Step 5: Column Select Transform where Data Table is updated as:
SELECT

1221

| Column Name | OPERATIONS |
|---|---|
| C1 | C1 |
| C2 | C2 |
| C3 | C3 |
| C4 | Concat ('US', Substring (C6, 1, 10)) |
| C5 | C4*10 |

Fig. 12

```
// The following pseudo code describe the basic
// transform reordering algorithum.
// A Plan has multiple Intermediate Transforms for each Intermediate Transform in the Plan
{
    while the previous is a non-optimizable
        Transform
    {
        if there is no column manipulation dependency
            between the current transform and the previous
            transform
        {
            switch the position of the current and the previous
                transform.    1407
        {
    {
    move to next Intermediate Transform    1409
{
```

1403 encompasses the outer while block; 1405 encompasses the if block; 1401 labels the overall algorithm.

Fig. 14

DATA FLOW PLAN OPTIMIZER

BACKGROUND OF THE INVENTION

1. Field of the Invention

The invention relates generally to transformation of data read from a data source so that it is in the proper form to be stored in a data sink and more particularly to transformation of data that is organized in one manner in the data source so that it can be stored in a data sink where it is organized in another manner.

2. Description of Related Art

One of the most valuable assets that any organization has is the data that it accumulates as a result of its operations. Nowadays, an organization stores its data in databases maintained by database systems. An organization of any size at all will have a number of different databases. The reason for this is that each database has an organization peculiar to itself and different uses of data require different organizations of the data. For example, a database which a company uses when dealing with its customers is termed an operational data base. Operational databases are designed to perform transactions: that is, they record when an order is received from a customer, when the order is shipped, when the company is paid, and so on. The operational database is thus organized in a fashion which permits such transactions to be performed as rapidly and reliably as possible.

Another use of databases in an organization is to store data for analysis. The ultimate source of much of this data is the operational databases, but if the data is to be useful for analysis, it must be organized in the database in a fashion which permits the analyst to easily find out what he or she wants to know. One class of such analytical databases is termed data warehouses; the data warehouse contains data from all of the organization's operations and is organized in a fashion which permits global analysis. Another class of such analytical databases is termed data marts; a data mart contains information that is useful for a particular functional area of the organization. The data in a data mart may come from the data warehouse or the operational data or other sources, but it is organized in the way that is most useful for the functional area that uses the data.

As is apparent from the foregoing, many organizations now have a number of differently-organized databases in which much of the information is the same. It has thus become necessary for these organizations to move data from a source database in which it is organized in one way into one or more sink databases in which it is organized in different ways. Because the data in the source database is organized differently from the data in the sink database, it is heterogeneous to the sink database. In the course of the move, the data must be transformed so that it is in the proper form for the sink database and is therefore no longer heterogeneous to it.

Data may be heterogeneous to a given database in two ways: it may be schematically heterogeneous and it may be semantically heterogeneous. Data is schematically heterogeneous when it is organized according to a different model from the one used in the given database, for example, when it is organized to be quickly accessible by customer account number rather than by an interval of time. Data is semantically heterogeneous when the data values have different semantics and structural representations from the ones used in the given database. For example, one database may represent monetary amounts as integer numbers of pennies, while another may represent them as fixed decimal numbers.

Schematic heterogeneity results in two kinds of conflicts between the source and sink databases: naming conflicts and structural conflicts. Naming conflicts include synonym and homonym problems with names of both tables and columns within tables; structural conflicts result when the structure in which a given piece of information appears in the source database is different from the way in which the given piece of information appears in the sink database. For example, the information which may need to be copied from the source to the sink may be a list of date-stock price pairs for the stock of Oracle Corporation. In the source database, the list may be in a table called "Oracle" that has two columns: one for the dates and the other for the stock prices. In the sink database, the list of oracle stock prices may be part of a stock prices table that includes stock prices of other companies, with columns for the date, the name of the stock, and the stock price. In another sink database, the stock prices table may have columns for the date and for each company, with the price for a given company on a given date being in the company's column in the row in which the given date appears in the date column.

Semantic heterogeneity results when the data values in the source have different representations in the sink. The different representations may simply be different names, for example, "Oracle" represents Oracle Corporation in the source, while "Oracle Corp. represents it in the sink, they may be different measurement scales, for instance prices in U.S. $ in the source and prices in Japanese ¥ in the sink, or decimal stock prices in the source and fractional stock prices in the sink, or different measurements, for example, latest stock closing price in one database versus latest trade price in the other, or different granularity of measurement (for example, monthly salary versus yearly salary), and classic data type conflicts. For example, a serial number may be represented as an integer in one database and as a character string in the other. Even where the representations are the same, there may be size differences. One database may use a 10-character string for the serial number, while another may use a 16-character string.

As will be apparent from the foregoing, data transformation is a necessary and complex part of copying information from one database to another. One way to do data transformation is to write a special program to perform the transformation. The problem with this approach is that the person writing the program must be an expert in the source and sink database systems, in the structures of the of the source and sink databases, in the semantics of the data being transformed, and in the programming language used for the special program. Writing transformation programs is thus strictly a matter for data processing experts, with all of the concomitant expense and delay.

The need for data processing experts was reduced by the development of a data transformation system by Sagent Technology, Inc. This system is described in the paper, Colin J. White, Building a corporate information system: the role of the datamart, which is dated February, 1997 and was available in December, 1999 at the Sagent Technology Web site, www.sagent com. FIG. 1 gives an overview of this system 101: System 101 permits a user to copy data stored in data source 111 to data sink 113 while doing the necessary transformation. The user defines the transformation using a set of pre-defined data transforms that are supplied with system 101. Included in these transforms are a number of source read transforms 115 for reading data from different kinds of data sources 111, a number of intermediate transforms 117, which define different transformation operations for dealing with inhomogeneities between the data in source database 111 and the data as it is stored at 120 in data sink 113, and a number of write transforms 119 for writing data to different kinds of data sinks 113.

To make the transformation required to copy data from source 111 to sink 113, the user specifies a data flow plan 107 which is a sequence of the transforms. The first is the source read transform 115 required for the data source. For example, if the data source is a relational data base, source read transform 115 is a simple SELECT query (no WHERE clauses) running on a real or virtual table defined in source database 111. Then come as many of the intermediate transforms as it appears to the user are required to perform the transformation. Each intermediate transform receives data from its predecessor transform and provides the data, transformed as specified by the transform, to the successor transform. Finally, when the data is in the form required for data sink 113, the sink write transform required for data sink 113 does the writing. The intermediate transforms include join and union transforms, which perform join and union operations on the outputs of two predecessor transforms, and split transforms, which split the input they receive into output for two successor transforms.

In the Sagent system, the user specifies the sequence of transforms by means of a graphical user interface 105 in which each transform is represented by an icon. To make a data flow plan, the user simply arranges the icons in the order in which the transforms are to occur. Data flow plan maker 104 takes the sequence of icons specified by the user and makes from it data flow plan 107, which is code that can be executed by flow plan execution engine 109. Flow plan execution engine 109 performs the transforms specified in flow plan 107 in the order in which they are specified in the flow plan, beginning with the read operation specified in read transform 115 and ending with the write to sink operation specified in write transform I1 9.

While the Sagent system's technique of specifying a transformation as a sequence of predefined transforms makes it possible for people who understand only where the data is in the source, what transforms are necessary, and where the transformed data is to go in the sink to copy data from a source 111 to a sink 113, the data flow, plans 107 produced using the technique have a number of problems:

They take no advantage whatever of the powerful data processing capabilities of modern database systems. This has a number of costs:
  The database systems have been specifically designed to do the operations that are typically specified in the transforms. In many cases, data source 111 or data sink 113 can do much of the work involved in a transformation much more efficiently than flow plan execution engine 109 can.
  Since all of the transforms are done in flow plan execution 109, all of the data must be moved from data source 111 to execution engine 109. Engine 109 and data source 111 are typically on different platforms, so the move must be done via a slow cross-platform link.
data is passed from one transform to the next long after it is required for the transformation.
Each transform has a significant amount of overhead, but the Sagent system makes no attempt to reduce the number of transforms.
Flow plan execution engine 109 will process transforms in parallel, but data dependencies among transforms prevent system 101 from taking full advantage of the performance improvements offered by parallel processing.

The efficiency of the flow plan depends completely on the capability of the user who makes it. There may be a better way to do the transformation than the user chooses, but the system simply does what the user specifies.

It is an object of the invention disclosed herein to solve the foregoing problems and to thereby provide a system for transforming which is as easy to use as system 101, but more efficient.

SUMMARY OF THE INVENTION

The invention disclosed herein provides solutions to the problems of presently-available data transformation systems by providing a data transformation system with a data flow optimizer that optimizes the data flow plan to make it more efficient. The optimized data flow plan produced by the optimizer is equivalent to the original data flow plan but has fewer transforms than the original data flow plan.

The optimizations performed by the optimizer include read/write optimization and merge optimization. Read/write optimization is used when the data source or sink is a database system or other system which can perform operations on the data it contains. In this kind of optimization, the optimizer finds transforms in the original data flow plan that specify operations that can be performed in the source or sink and then replaces these transforms and the simple read or write transform of the original data flow plan with a read or write transform that specifies that operations equivalent to those of the replaced transforms be done in the data source or sink. Advantages of read/write optimization in addition to reducing the number of transforms include using the often highly efficient facilities of the source or sink system to perform the operation and reducing the amount of data that is moved from the source to be processed by the data transformation system.

Merge optimization combines intermediate transforms into a single merge transform that specifies operations equivalent to those specified in the combined transforms. The optimizer further constructs the merge transform in such a fashion that operations in the merge transform that are independent of each other can be performed in parallel. Merge optimization thus not only reduces the number of transforms, but also increases the amount of processing that can be done in parallel and reduces the amount of data that is moved through the transformation. A given data flow plan may have merge optimization, read/write optimization, or both applied to it. In one aspect of the invention, the original data flow plan continues to be displayed in the user interface after optimization, i.e., the optimization is transparent to the user.

In another aspect of the invention, the optimizer includes a data flow plan analyzer that examines the transforms of the data flow plan to determine whether they are optimizable. If the analyzer finds that a transform is optimizable, it passes properties of the transform to a transform optimizer. The transform optimizer collects the properties for optimizable transforms until the analyzer finds the next transform that is not optimizable. Then the transform optimizer produces an optimized read transform, an optimized write transform, or a merge transform from the sequence of transforms, depending on the kind of optimization being done and replaces the sequence of transforms with the optimized transform. The analyzer may increase the amount of optimization that can be done by reordering the transforms of the original data flow plan to produce. longer sequences of optimizable transforms.

BRIEF DESCRIPTION OF THE DRAWING

FIG. 5 shows details of the merge transform including its processing threads;

FIGS. 8A and 8B show how operations in intermediate transforms may be mapped to operations performed in SQL queries;

FIGS. 9A and 9B show steps in the creation of an example read optimization data table 206;

FIG. 10 shows the query produced from the table of FIGS. 9A and 9B;

FIG. 11 is pseudo code for merge transform optimization;

FIG. 12 shows steps in the creation of an example merge optimization data table 210;

FIG. 14 is pseudo code for reordering transforms.

Figure 1:
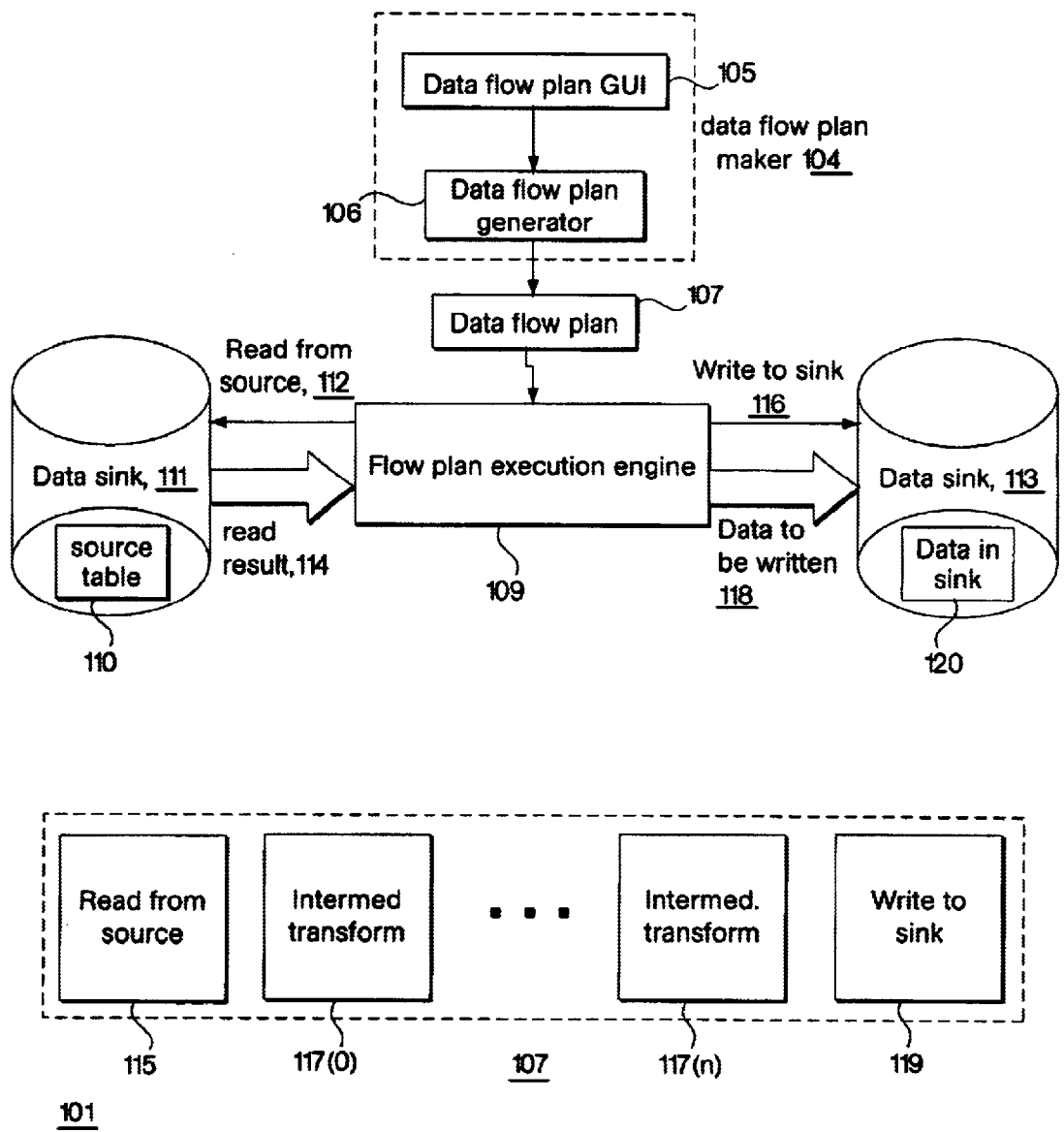
FIG. 1 is an overview of prior-art data transformation using a data flow plan.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will first provide an overview of a data transformation system that employs the invention and will thereupon give a detailed description of the implementation of the invention in a preferred embodiment.

Figure 2:
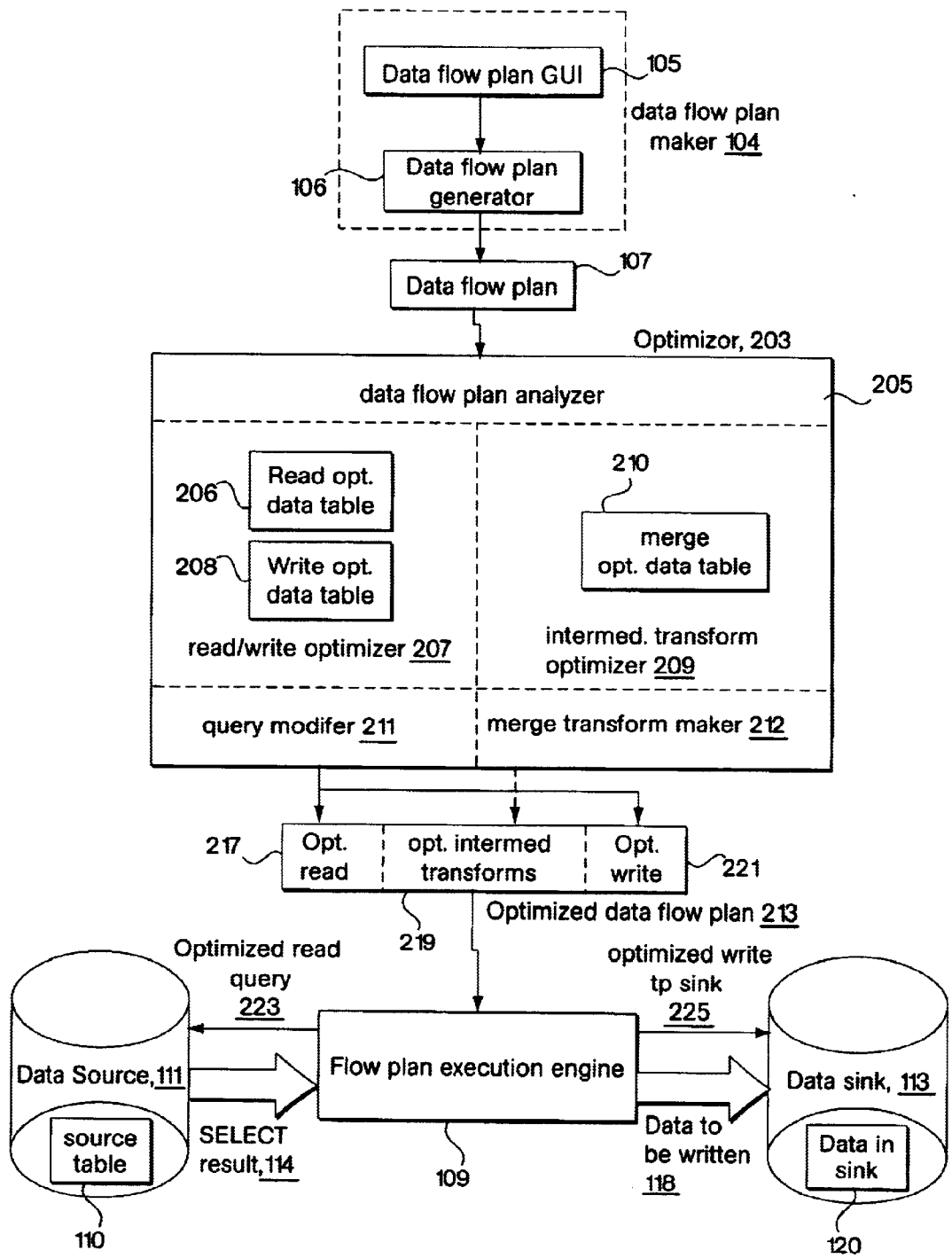
FIG. 2 is an overview of data transformation using a data flow plan optimizer.

Overview of a Data Flow System With a Flow Plan Optimizer: FIG. 2

FIG. 2 shows a data flow system 201 which is like data flow system 101, except that an optimizer 203 has been inserted between data flow plan 107 and flow plan execution engine 109. Optimizer 203 receives data flow plan 107 produced by data flow plan maker 104 and optimizes it to produce optimized data flow plan 213, which is executed by flow plan execution engine 109 in the same fashion as unoptimized data flow plan 107 in data flow system 101. Optimized data flow plan 213 produces the same transformation as unoptimized data flow plan 107, but does so in a much more efficient manner. Exactly what optimizations are done will of course depend on the data flow plan 107 being optimized and the environment in which flow plan execution engine 109 operates. For example, when flow plan execution engine 109 is running on a multiprocessor system, optimizations are possible that are not possible when flow plan execution engine 109 is running on a uniprocessor system.

In a preferred embodiment, optimizer 203 does two kinds of optimizing:

- where data source 111 and/or data sink 113 is a database system, read-write optimizing moves as many of the transformation operations as possible into the query 223 that reads the data to be transformed from source 111 and/or the query 225 that writes the data being transformed to sink 113.

- intermediate transform optimizing modifies the remaining intermediate transformations by merging them into merge transforms. This reduces the number of transforms, reduces the amount of data that must be moved during the transformations, and increases the amount of parallel processing that can be done.

Details of optimizer 203 in a preferred embodiment will be explained later. Other embodiments may perform only intermediate transform optimizing or read-write optimizing, or may do other kinds of optimizing that are made possible by the environment in which the optimizer operates.

It should be pointed out here that from the point of view of a user of system 201, the only difference in the operation of system 201 from that of system 101 is the increased efficiency of the transformation. The user uses GUI 105 in both systems to make unoptimized data flow plan 107; optimizer 203 then produces optimized flow plan 213 from unoptimized data flow plan 107 without intervention by the user and without changing what the user sees in GUI 105.

Figure 3:
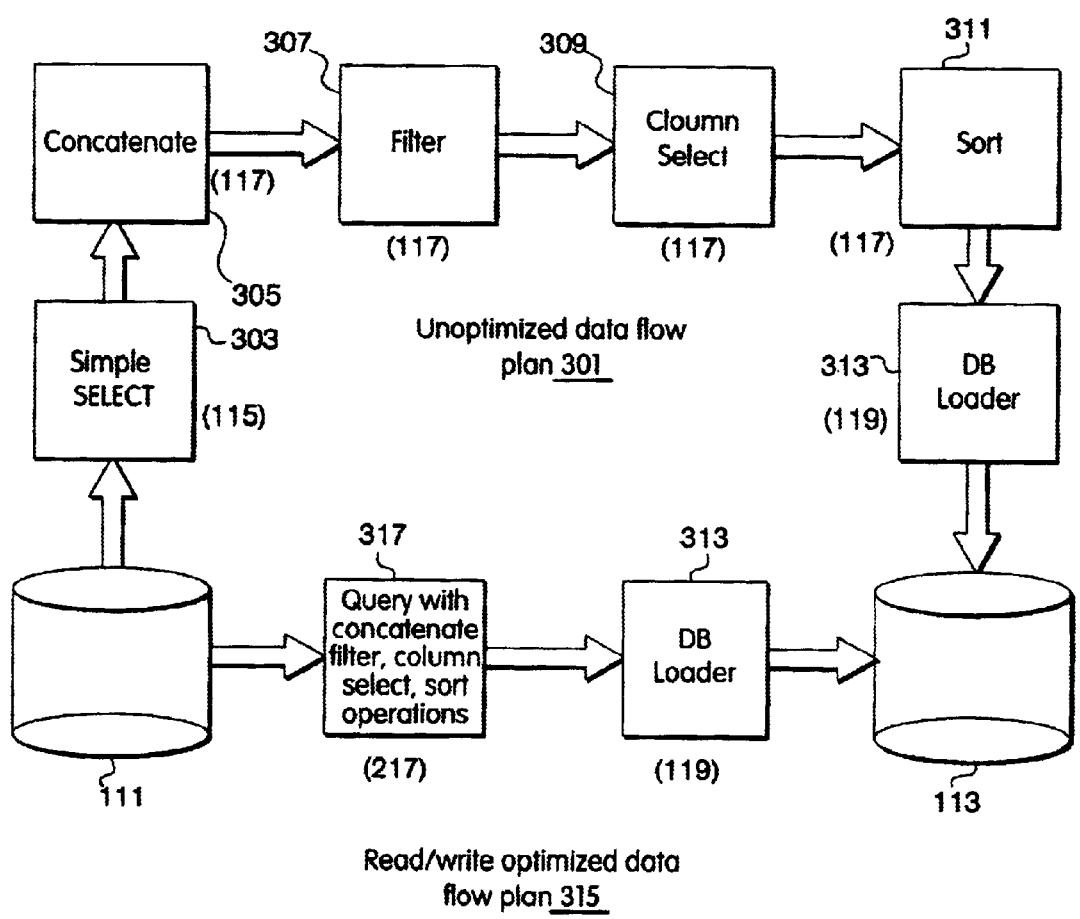
FIG. 3 shows an unoptimized data flow plan and an equivalent optimized data flow plan in which the read transform has been optimized.

Overview of Read-write Optimization: FIG. 3

FIG. 3 is an overview of read-write optimization. It shows an unoptimized data flow plan 301 and an optimized data flow plan 315 for the following transformation: First, 1,000,000 records are read from a relational database table, ABC, in source 111 which, contains 7 columns C1, C2, C3, C4, C5, C6 and C7. Second, string values from columns C1 and C2 are concatenated and stored in a new string column, N 1. Third, data records are filtered based on the condition C3>=5000. Fourth, columns C1 and C2 are removed, since their data is now in N 1. Fifth, the records are ordered in ascending order according to the record values in C3. Finally, load data of columns C3, C4, C5, C6, C7 and NI into the sink 113.

The data flow plan for this transformation is shown at 301 in FIG. 3. It has a source read transform 115, five intermediate transforms 117, and a sink write 119. Source read transform 303 is performed using the simple SQL SELECT query:

SELECT C1,C2,C3,C4,C5,C6,C7
FROM ABC

This query selects records containing all of the values in all of the columns C1 through C7 of table ABC. It is the only SQL source read transform available to users of data flow plan GUI 105. Concatenate transform 305 concatenates the value in C1 for each record with the value in C2 for that record and places those values in a new column N1 that is created for the transformation. The data in columns C1 . . . C7 and new column N1 all go to filter transform 307, which removes all records for which the value in C3>=500. The data of columns C1 . . . N1 for the remaining records all goes to column select transform 309, which removes the data in columns C1 and C2. The next transform, Sort 311, sorts the records on the value in column C3 in each record. DB Loader 313, finally, loads the data as transformed by transforms 305 through 311 into sink 113.

Many database systems, including the ones manufactured by Oracle corporation, Redwood Shores, Calif. 94065, can perform the concatenation, filtering, column selection, and sorting operations specified in the intermediate transforms 117 of unoptimized data flow plan 301 as part of a query. Thus, when source 111 is such a database system, data flow optimizer 203 can merge transforms 303 through 3.11 into an optimized read transform 317 that runs a query on source 111 which does the concatenation, filtering, column selection, and sorting operations. Since optimized read transform does the operations of transforms 305 through 311, optimized flow plan 315 contains only two transforms, read transform 317 and DB loader transform 313, instead of the six transforms of unoptimized plan 301. The SQL query run by read transform 317 looks like this:

SELECT C3, C4, C5, C6, C7, CONCAT(CI,C2) NI
FROM ABC
WHERE C3>5000
ORDER BY C3 ASC

In a test which compared the time it took to do the transformation using unoptimized data flow plan 301 and the time it took to do it with optimized data flow plan 315, the reading, transformation, and writing of the 1,000,000 records took 20.26 minutes with unoptimized data flow plan 301 and 5.76 minutes with optimized data flow plan 315. Reasons for this substantial gain in efficiency include the greater speed with which database system 111 performed the operations, the fact that only the data needed for operations that cannot be done in database system 111 is moved from data source 111 into flow plan execution engine 109 and through the transforms, and the fact that execution of each transform includes significant overhead: for each transform, the transform must be initialized, the data it is to work on must be retrieved, and when the processing is finished, the data must be stored or buffered. Reduction in the number of transforms from 6 to 2 thus greatly reduces the amount of transform overhead.

Figure 6:
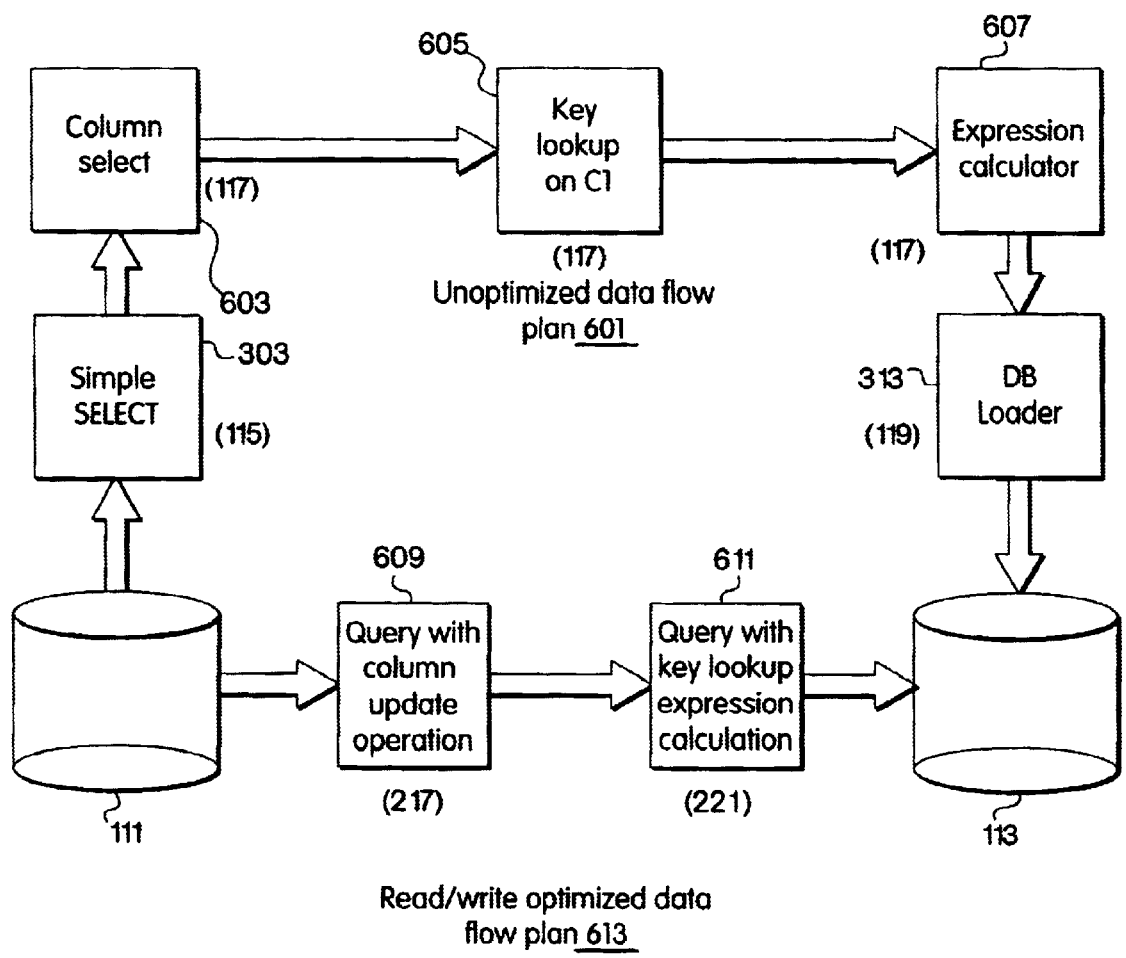
FIG. 6 shows an unoptimized data flow plan and an equivalent optimized data flow plan in which both the read transform and the write transform have been optimized.

Optimization of Writing to Sink 113: FIG. 6

The above example optimizes only reading from the source; in some situations, however, writing to the sink may also be optimized by doing a part of the transformation in an update query to the sink instead of in a transform. An example of one such situation is shown in FIG. 6. Here, both source 111 and sink 113 are capable of performing SQL queries. Unoptimized data flow plan 601 has five transforms: a simple select 303, a column select 603, which selects a subset of the columns provided by the simple SELECT 303, a key lookup transform 605, which looks up keys in the subset of the columns provided by transform 603, expression calculator 607, which performs a mathematical operation such as multiplication on the fields of a column, and database loader 393, which loads the result of the transforms into database sink 113.

Of these five transforms, the operations of transforms 303 and 603 can be done as a query in source database system 111, while those of transforms 605,607, and 313 can be done as a query in sink database system 111. Thus, optimized data flow plan 613 consists of two transforms instead of 5 and all of the operations are performed either in database 111 or in database 113. The first transform 609 is a query which performs the column update operation, so that the columns removed by column select transform 603 are removed before the data ever leaves source database 111. The second transform 611 is a query on sink database 113 which not only loads the data into sink database 113 but does the key lookup and expression calculator operations and thus replaces transforms 605, 607, and 313. Again, efficiency of transformation is increased by reducing the number of transforms and thereby the transformation overhead, reducing the amount of data that moves through the transforms, and using the more efficient facilities of the database systems to perform operations that would otherwise be performed in the transforms.

Figure 4:
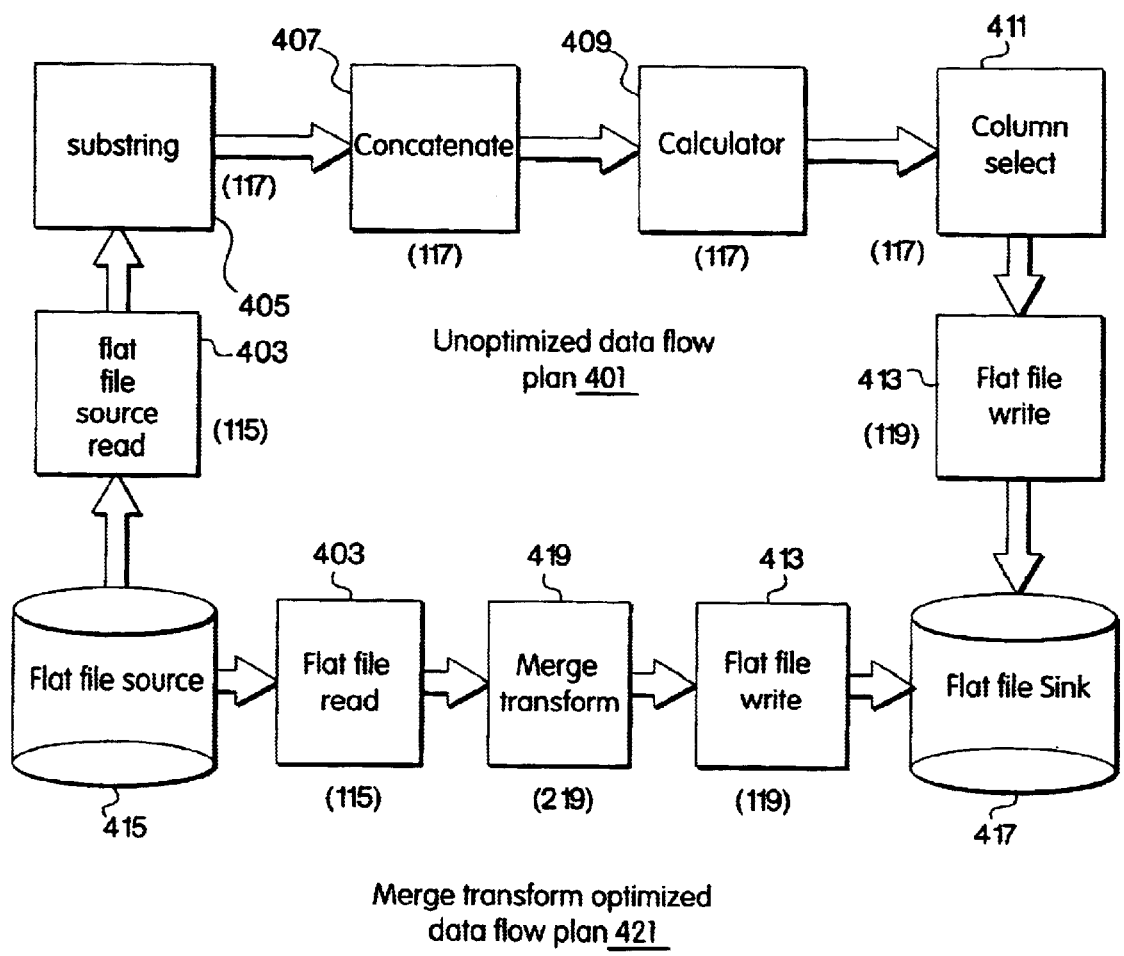
FIG. 4 shows an unoptimized data flow plan and an equivalent optimized data flow plan in which intermediate transforms have been combined into a merge transform.

Overview of Intermediate Transform Optimization: FIG. 4

FIG. 4 shows how the intermediate transforms 117 of a data flow plan may be optimized to reduce the number of transforms, reduce the amount of data flowing from one transform to the next, and to increase the amount of parallel processing that can be done. In the example shown in FIG. 4, 880,000 records are being transformed. Source 415 is a flat file, as is sink 417, so the only operations that can be performed on the data in the source and sink are those provided by the file systems. There is consequently no possibility of read-write optimization. The source flat file contains 6 columns, C1,C2,C3,C4,C5, and C6. The destination flat file will contain 5 columns: C1,C2,C3, and two new columns, N1 and N2, whose values are made from values of columns C4, C5, and C6.

The transforms in unoptimized data flow plan 401 are the following: flat file source read 403, which reads the 880,000 records from flat file source 415, substring 405, which makes a substring consisting of the first 10 characters in C6 and then stores the substring back into C6, concatenation 407, which concatenates 'US' to the substring in C6 and stores the concatenated value into a new column N1, calculator 409, which multiplies the value of C4 by 10 and stores the result into new column N2, and flat file sink write 413, which writes the 5 columns produced by the transform to flat file sink 417.

Optimization of the intermediate transforms is possible here because the operations can be arranged in a fashion such that there are no time dependencies between operations performed on different columns of data. Since that is the case, transforms 405, 407, 409, and 411 can be merged into a single merge transform 419 which performs all of the operations. Moreover, since there are no time dependencies, the operations can be performed in parallel. Merge transform optimized flow plan 421 thus consists of three transforms, rather than 6: flat file read 403, merge transform 419, and flat file write 413.

There is again a significant difference in performance between unoptimized plan 401 and optimized plan 421. When unoptimized plan 401 is used to transform the 880,000 records in a uniprocessor environment, the transformation takes 14.71 minutes; when optimized plan 421 is used, the transformation takes 8.57 minutes. In the uniprocessor environment, the performance difference is primarily the result of the reduction in transform overhead resulting from the reduction in the number of transforms and the result of reducing the amount of data that is written and read in the course of doing the transforms. The performance difference is even greater in a multiprocessor environment, which permits parallel performance of the operations in merge transform 419.

Details of Merge Transform 419: FIG. 5

FIG. 5 shows what happens inside the transforms of unoptimized data flow plan 401, shown at 501, and inside the transforms of optimized data flow plan 421, shown at 503. In FIG. 5, each transform is in a box labeled with the transform's number in FIG. 4 and arrows show the flow of the data represented by a column in the course of the transform.

Inside view 501 shows clearly how much unnecessary work is done in flow plan 401. The data from all of the columns that are read in transform 403 plus the data in the new columns N1 and N2 remains in flow plan 401 until column select transform 411. This is so even though the data of column C5 is neither written to flat file sink 417 nor used in any of the transform operations, even though the data of column C6 is no longer needed after the concatenation transform 407, and even though the data of column C4 is no longer needed after the calculator transform 409. Moreover, even though the operation performed in a given transform of flow plan 401 involves data from only one column, the data from all of the columns is read at the beginning of the transform and written at the end of the transform. Not only is much of the work unnecessary, it cannot be done in parallel, since transform 407 is dependent on the results of transform 405, transform 409 is dependent on the results of transform 407, and transform 411 is dependent on the results of transform 409.

Inside view 503 shows how all of the operations in transforms 405 through 411 in unoptimized data flow plan 401 are combined into a single merge transform 419. There are two aspects in which merge transform 419 is different from intermediate transforms 117. First, merge transform 419 is able to perform any operation done by an intermediate transform 117 other than a split or join operation. There is thus no need to have one transform for the substring operation, another for the concatenate operation, a third for the multiplication, and a fourth for the column select operation.

Second, because all of the operations may be performed in a single transform, it is often possible to arrange the operations done by the merge transform in a fashion which permits parallel processing. This arrangement of the operations is termed herein column-based multithreading. Column-based multithreading is based on the observation that operations which affect only a single one of the columns that are the result of the processing done by the merge transform 419 may be done in parallel. In merge block 419, the result columns are C1,C2,C3,N1, and N2, and none of the operations that affect these columns affects more than one of them. To take the most complex example, column N1 is the result of the substring operation performed on C6 and the concatenation operation on C6 which produced column N1. Neither of these operations has any effect on any of the other result columns, and consequently, the substring operation, the concatenation operation, and the creation of a new column to hold the results of the concatenation, can be done independently of the operations on any of the other result columns.

Because none of the operations on any of the result columns affects any other of the result columns, flow plan execution engine 109 can be modified so that the operations on each result column are be performed by a different thread Of execution. Thus, in merge transform 419, there are 5 threads of execution 505(1 . . . 5), one for each result column. In a uniprocessor environment, the thread scheduler component of the operating system will schedule the threads so that if one of them is waiting for I/O to complete, another will run; in a multiprocessor environment, the thread scheduler can schedule each thread to run on a different processor.

In making merge transforms in a preferred embodiment, unoptimized intermediate transforms 117 are merged into a merge transform as long as two conditions hold:

the operation being performed by the intermediate transform can be performed by the merge transform; and the operations specified by the intermediate transform can be done in parallel with the operations specified in the other intermediate transforms in the merge transform.

The actual technique used in the preferred embodiment for making merge transforms will be described in detail in the following.

Read/write optimization and merge transform optimization are independent optimization techniques. Each may therefore be applied by itself to optimize a data flow plan; however, both may be applied to the same data flow plan. This may be done where at least some of the data sources 111 and/or data sinks 113 can do operations beyond simple file reads and writes. Where this is the case, optimizer 203 takes each transform in turn. If the transform is a source read transform on a source where the source read transform can perform additional operations, optimizer 203 takes each following transform and considers it as a candidate for read/write optimization; if it can be optimized in that way, optimizer 203 does so; when optimizer 203 reaches the first following transform that is not a candidate for read/write optimization, it looks at the next following transform and determines whether it is a candidate for merge optimization with the first following transform. If it is, it does the merge optimization. It continues in this fashion until the next candidate is no longer mergeable. If it is a source transform, optimizer 203 again attempts read/write optimization; if it is not, optimizer 203 again attempts merge optimization. At the end of the process, all of the optimizable transforms in the original data flow plan have been replaced by optimized reads 217, optimized writes 221, or merged intermediate transforms 219. It should be pointed out here that while the preferred embodiment has been implemented for databases that respond to SQL queries, the techniques of read/write optimization can be used with any source or sink where an operation performed in a transform can be mapped onto an operation which is performed by the source or sink.

Detailed Implementation of Data Flow Plan Optimization

At the highest level, data flow plan optimization works like this in a preferred embodiment of optimizer 203: data flow plan analyzer 205 receives unoptimized data flow plan 107 and beginning with the first read transform 115, it works through data flow plan 107 considering each transform in turn. If analyzer 205 recognizes a read transform as a query, it places a description of the transform in a read optimization data table 206 and adds descriptions of the following transforms that can done by the query to data table 206; when it encounters the first transform which cannot be so optimizable, it indicates that fact to read/write optimizer 207, which uses read optimization data table 206 and query modifier 211 to modify read transform 115 into an optimized read query 217 that performs the operations specified in the optimized transforms; that query then replaces the optimized transforms in the original data flow plan. Write optimization works in the same manner, with write optimization data table 208 being used to generate an optimized write query 221 which replaces the optimized transforms.

If analyzer 205 recognizes a transform as being optimizable by incorporating it into a merged transform, it places a description of the transform in a current merge transform table 210. It continues placing optimizable transforms in the current merge transform table 210 until it encounters a transform that cannot be optimized by merging; merge transform maker 212 then makes a merge transform 219 that replaces the optimizable transforms in current merge transform table 210. Thus, at the end of the process, only those transforms of original data flow plan 107 remain in optimized data flow plan 213 which could neither be optimized into read or write queries or into merge transforms; all of the other transforms have been replaced by the read or write queries or merge transforms.

Figure 13:
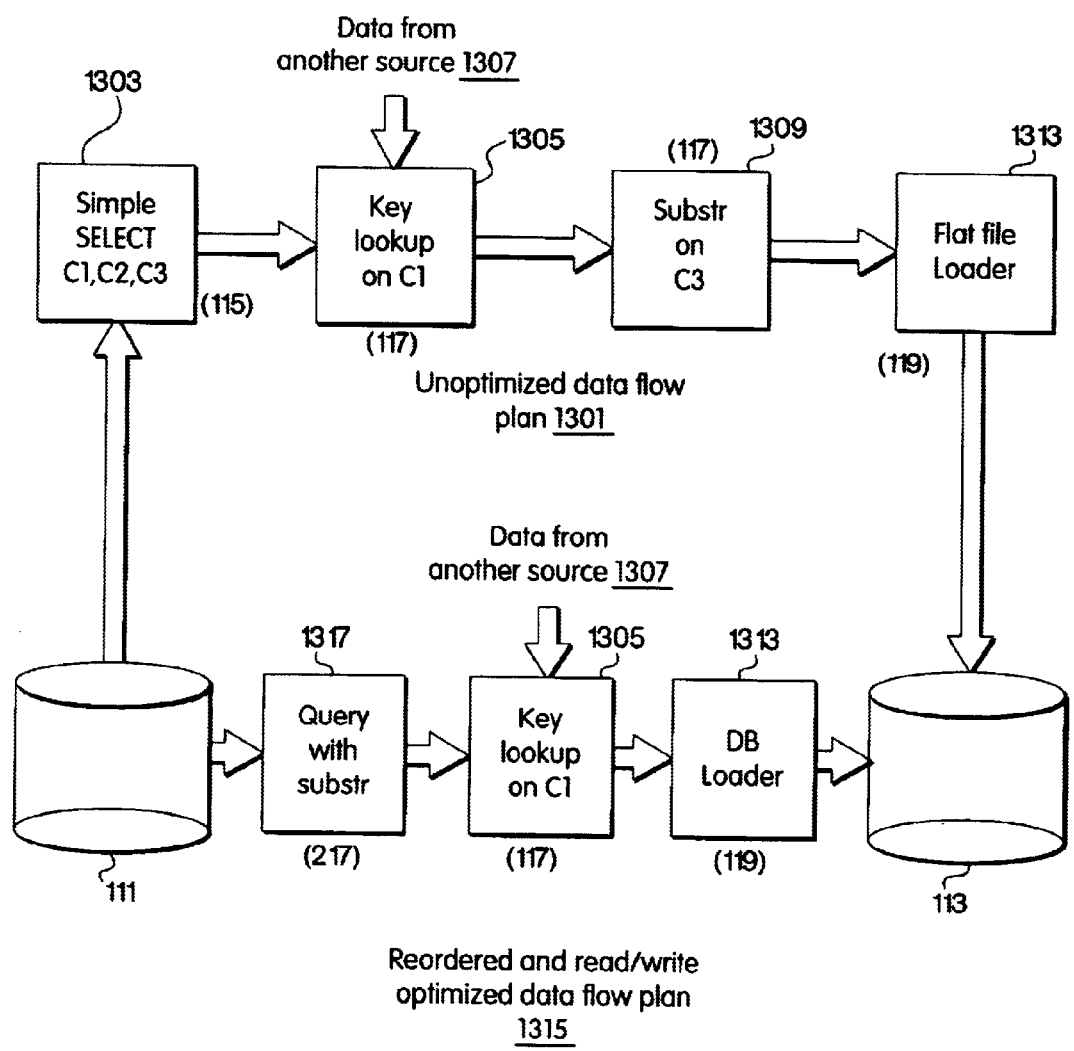
FIG. 13 shows an unoptimized data flow plan and an equivalent optimized data flow plan that takes advantage of reordering to increase the amount of optimization.

Reordering Transforms to Increase the Amount of Optimization: FIGS. 13 and 14

As is apparent from the foregoing, the amount of optimization that can be done by optimizer 203 depends on the order of the transforms in data flow plan 107. For example, if a transform that cannot be combined with an SQL read transform is followed by one that could be, the transform that could be transformed will not be. For this reason, it is useful for data flow plan analyzer to analyze the entire unoptimized data flow plan 107 and to the extent possible, rearrange it to place the transforms in the order which permits the greatest amount of optimization.

FIG. 13 shows an example of such an optimization. Unoptimized data flow plan 1301 involves a source read transform 1303 that reads columns C1, C2, and C3 from source 111, a key lookup transform 1305 on column C1, a substring transform on column C3, and a flat file load transform 1313 that loads the data into sink 113. Key lookup transform 1305 uses keys in column C1 to locate data in a source other than source 111; consequently, database source 111 cannot do the operation in transform 1305 and data flow plan 1301 is not read/write optimizable as it stands.

Column C3 is not involved in transform 1305, and consequently, substring transform 1309 is not dependent on key lookup transform 1305. Since that is the case, unoptimized data flow plan 1301 may be reordered so that substring transform 1309 precedes key lookup transform 1305. When that is done, substring transform 1309 may be performed in a query in source 111 and substring transform 1309 may be replaced by an optimized read 217 that performs a query with a substring operation, as shown at 1317. Reordering can of course also be done with merge transforms. If there is a transform following a transform that cannot be optimized into a merge transform and there are no column manipulation dependencies between the following transform and the unoptimizable transform (i.e., the following transform involves columns that were manipulated in the unoptimizable transform, thee following transform may be moved ahead of the unoptimizable transform.

FIG. 14 shows pseudocode 1401 for an algorithm for reordering transforms. The. algorithm works for either the read/write transform or the merge transform case. The algorithm would be applied to data flow plan 107 before read/write optimization or merge optimization was performed on it. As set forth in pseudocode 1401, data flow plan analyzer 205 looks at each of the intermediate transforms in data flow plan 107 in turn, beginning with the first (loop 1403). When analyzer 205 finds an intermediate transform that is not optimizable, it enters loop 1405 and begins examining the intermediate transforms following the non-optimizable intermediate transforms. If a following transform has no column manipulation dependency on previous transforms, the positions of the current and previous transforms are switched, as shown at 1405. Thereupon, analyzer 205 moves to the next intermediate transform.

Details of Optimization of Read Transforms: FIGS. 7–10

Figure 7:
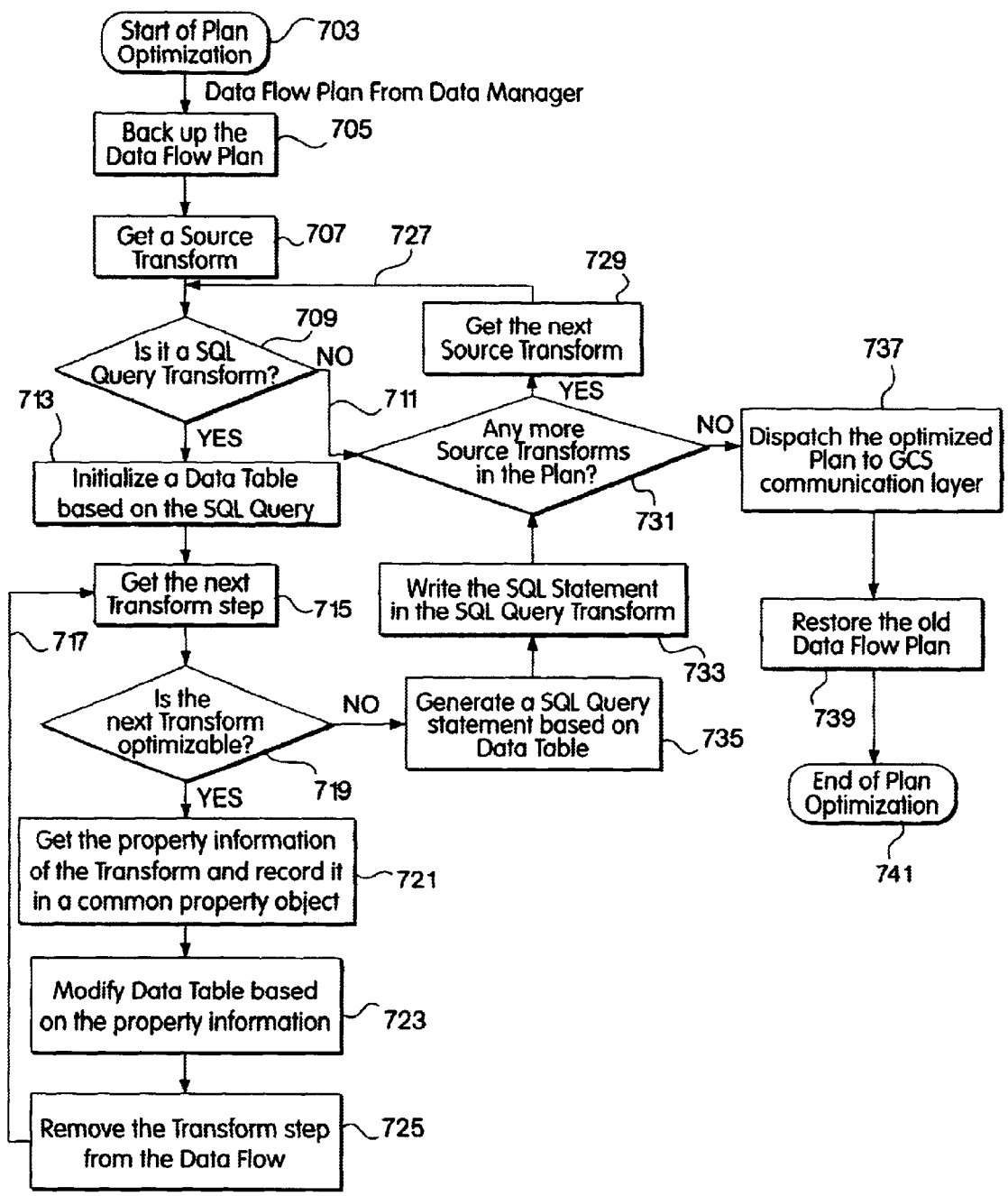
FIG. 7 shows a detailed flow plan for read transform optimization.

FIG. 7 is a detailed flowchart 701 of optimization of SQL read transforms 115 and read optimizable intermediate transforms 117 into optimized reads 217. Flowchart 701 is of an embodiment of optimizer 203 which only does read optimization. Beginning with start block 703, unoptimized data flow plan 107 is received in optimizer 203. There the first step (705) is to make a copy of unoptimized data flow plan 107. Unoptimized data flow plan 107 is preserved because it is the source of the view of the data flow plan given by data flow plan GUI 105. As noted above, this view remains unchanged by the optimization. With the copy made, data flow plan analyzer begins analyzing the transforms. It is able to do the analysis because each transform includes a set of properties which indicate among other things what columns the transform works on and what operation it performs on them.

Whenever data flow plan analyzer 203 finds a source transform 115 from data flow plan 107, it determines whether it is an SQL source transform 115; if it is (709), it may be possible to combine intermediate transforms 117 with it to make an optimized read transform 217 with an SQL query that performs the operations specified in source transform 115 and the intermediate transforms 117. If source transform 115 is not an SQL query (branch 711), data flow plan analyzer 203 gets the next source transform, if any (731,729) and if there is one, returns to decision block 709. If it is an SQL source transform, data flow plan analyzer 715 provides the properties that describe the SQL query to read/write optimizer 207, which uses them to initialize a read optimization data table 206 for the optimized read transform 217.

Data flow plan analyzer 203 then enters loop 717, which continues reading intermediate transforms 117 and providing those properties relevant to read transform 217 to read/write optimizer 207 until it finds an intermediate transform whose operation cannot be made part of the SQL query and consequently cannot be combined with source transform 117. The next transform is fetched at 715, the determination whether it is optimizable is made at 719, at 721, a copy of transform 117's relevant properties is made, and the copy provided to optimizer 207, which adds the copy to data table 206 made in step 713 (723). Once this is done, transform 117 is removed from the data flow plan (725). When the next transform 117 is not optimizable, query modifier 211 generates an SQL query from the contents at that point of read optimization data table 206 and replaces source transform 115 in the data flow plan with an optimized read transform 217 made from the SQL query.

Data flow plan analyzer then looks for the next read transform in plan 107, and if it finds one, it goes to decision block 709; otherwise, optimized plan 213 is finished. Optimizer 203 then dispatches optimized plan 213 to flow plan execution engine 109 (737) and copies the saved unoptimized data flow plan back into data flow plan 107 (739), thus finishing its work (741).

In an embodiment which did both read/write optimization and intermediate transform optimization, the intermediate transform optimization would begin after box 733 and continue until the next source transform was encountered. A merge transform loop that worked like loop 717 would process intermediate transforms until one was encountered which could not be optimized, making a merge optimization data table as it went, and on encountering the unoptimizable intermediate transform, the merge transform loop would make a merge transform containing the operations from the optimizable intermediate transforms.

Figure 8A:

As is apparent from the foregoing, an intermediate transform is subject to read/write optimization if the operation performed by a transform can be mapped to an operation performed by an SQL query. FIGS. 8A and 8B show these mappings. Column 803 lists the kinds of intermediate transform 117 which specify operations that may be done in an SQL query; column 805 indicates what the transform does; column 809 indicates the equivalent operation in the SQL query. Thus, row 813 indicates that the Add Columns intermediate transform 117, which simply creates new columns in the data flow, can be done with an SQL select new column operation that sets the values in the new column to NULL. In deciding whether a transform is optimization (decision block 715), data flow plan analyzer 205 simply examines the properties of the transform. If the properties indicate one of the transforms listed in column 803 of table 801, the operation indicated in column 809 is added to the current read optimization data table 206.

Figure 9B:
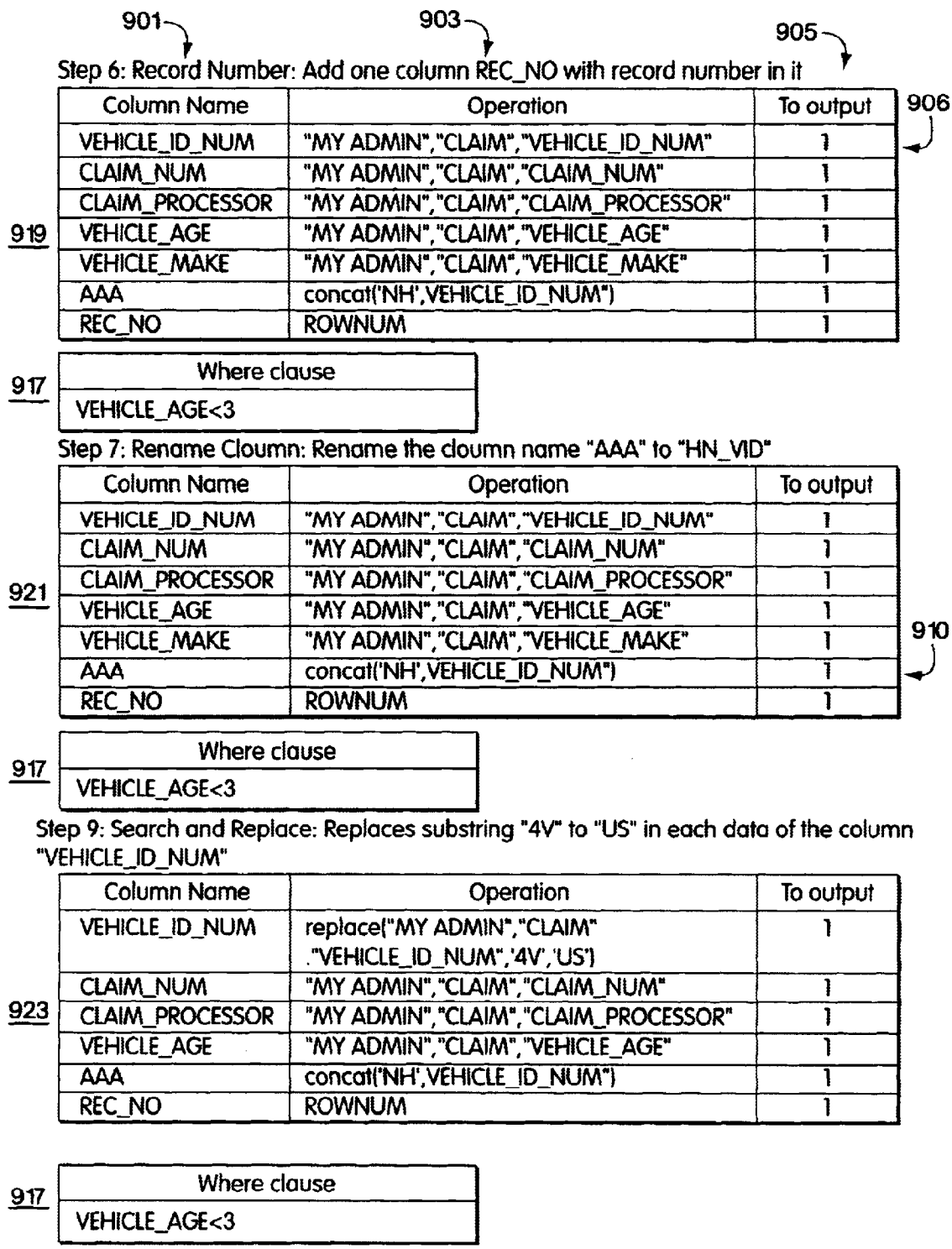

FIGS. 9A, 9B, and 10 show in detail how a read optimization data table 206 is built and how an SQL query is made from the information in table 206. The example upon which the figures are based is the following: the Data Flow Plan loads data using an SQL read transform from a database table "CLAIM" which contains approximately 800,000 records. The loaded data records are then manipulated by eight transforms with the following sequence:

(1) an Add Columns transform creates a new column named "AAA" in the data flow;
(2) a Column Select transform removes one unwanted column;
(3) a Concatenation transform concatenates a string "NH" with each data in the column "VEHICLE ID NUM" and puts the resulting data in the previously created column
(4) a Filter transform retrieves data records with the condition that the vehicle age is less than 3;
(5) a Record Number transform adds a new column "REC-NO" with record numbers in it;
(6) a Rename Columns transform renames the column name "AAA" to "NHVID";
(7) a Search-and-Replace transform replaces substring " 4V to "US" in each data of the column "VEHICLE ID NUM"; and
(8) a Substring transform keeps the first 10 characters of the data in the column "NH-VID". After these step transforms, a Delimited Text File Sink transform stores the resulting data records in a CSV file.

FIGS. 9A and 9B show the development of read optimization data table 206 as data flow plan analyzer 205 reads the above sequence of transforms. Data table 206 has three columns: column 901 indicates the names of the columns for which the data table specifies operations; column 903 indicates the operations on the columns, and column 905 indicates where the results of the operation on the column are to be output. Thus, a single row 906 of table 206 indicates a column name, one or more operations to be performed on the named column, and the destination of the results of the operations.

The version of data table 206 which is made in initialization step 713 is shown at 907 in FIG. 9A. Version 907 specifies the operations in SQL read transform 115, which in this case, simply retrieves the columns listed in column 901 from the database table specified by MYADMIN.CLAIM. Thus, in row 906, VEHICLE_ID_NUM is selected from the column with the same name of MYADMIN.CLAIM. Version 909 incorporates transform (1), which makes a new column AAA. No operations have been performed at this point on the new column, so version 909 simply has a new row 910 for the new column.

Version 911 incorporates transform (2), which removes the column VEHICLE_MAKE, represented by row 908 in versions 907 and 909; consequently, row 908 is no longer present in version 911. Version 913 incorporates transform (3), which concatenates the string 'NH' with the data in each field of the column VEHICLE_ID_NUM and puts the result in column AAA, so the concatenation operation appears in row 912 for column AAA. Version 915 incorporates transform (4), which removes records where VEHICLE_AGE >3. The transform is added to version 915 as WHERE clause 917.

Continuing with FIG. 9B, after the removal of the records by the WHERE clause, the remaining records are given new record numbers. This is done in transform (5), which adds a new column for the record numbers and sets the record number to the number of the row in the table produced by transform (4). Thus, version 919 of table 205 has a new row 918 for the new column RECNO, and ROWNUM in column 903 specifies that the record number in RECNO is to be the row number. The next transform, (6), renames the column AAA to $NH_{13}$ VID, as seen at row 910 in version 921.

Version 923 incorporates transform (7), which replaces the substring '4V' in the fields of the column VEHICLE_ ID_NUM, as seen in column 903 of row 906. Version 925, finally, incorporates transform (8), which takes a 10-character substring of the result of the concatenation operation that was added in version 913 (row 910). At this point, version 923 represents an SQL query that performs the operations of the read transform and all of the intermediate transforms specified in the data flow plan. The data flow plan is thus reduced to an optimized read 217 with the SQL query and a write to sink 119.

FIG. 10 shows SQL query 1001 produced from version 925 of table 206. The query is a SELECT query which selects columns from the table MYADMIN. CLAIM, as indicated in the original read transform. Once the framework for this query is set up as shown at 1003, the operations from column 903 of version 925 are simply inserted in the order in which they appear in version 925, and then WHERE clause 917 is added at the end. As can be seen from the example, most of the transform operations change the SELECT clause, while others change FROM and WHERE clauses.

Details of Optimization of Intermediate Transforms Into Merge Transforms: FIGS. 11 and 12

The technique used to combine two or more intermediate transforms 117 into a single merge transform 419 is like that used to combine transforms into an optimized read or write transform. An intermediate transforms 117 can be incorporated into a merge transform 419 if the following conditions hold:

the intermediate transform specifies an operation that can be performed by merge transform 419; and the operation specified in the transform can be executed in a thread for a specific output column, the thread having the property that its operations are not dependent on operations in other threads.

In a preferred embodiment, the merge transform can perform operations including

All mathematical, string manipulation and data type conversion operations.

Column creation and selection operations.

Again, data tables are used to store information about the operations of the intermediate transforms that are merged into the merged transform until no further merger is possible, at which point the merged transform is produced.

FIG. 11 shows pseudo code 111 for the algorithm used to produce merged transforms 419 in the preferred embodiment. Pseudo code 111 is made up of three nested loops. Outer loop 1103 examines each intermediate transform 117 in the data flow plan; middle loop 1105 looks for intermediate transforms with which at least the next intermediate transform may be merged; when one of these is found, a data table is initialized as indicated at 1109. Inner loop 1107, finally, checks whether each following transform is mergeable; if it is, it writes the description of the operation performed by the mergeable transform into the current merge optimization data table 210 and removes the mergeable transform from the data flow plan. When a following transform is unmergeable, a merge transform is made from the current merge optimization data table 210 and inserted into the data flow plan ahead of the umnergeable transform (1111). Execution of loop 1105 then continues.

FIG. 12 shows how merge optimization data table 210 is created for the merge transform optimization shown in FIGS. 4 and 5. Merge optimization table 210 has two columns, one specifying the column name (1203) and the other specifying operations to be performed (1205). There is thus a row for each column, with a column's row specifying the operations on the column. As before, data flow plan analyzer 205 reads the properties of the transforms in data flow plan 107 to determine what operations they perform and whether they can be merged. In unoptimized data flow plan 401, the first two intermediate transforms 117 can be merged; the transforms are substring 405 and concatenation 407; consequently, flow plan analyzer 205 provides the properties of substring transform 405 to optimizer 209. Optimizer 209 first initializes table 210 from the input columns of substring transform 405, as shown at 1201. On initialization, optimization table 206 has rows for the six columns C1 through C6. Next, optimizer 209 adds the substring operation specified by transform 405 to row 1211 of the table, as shown at 1209.

Flow plan analyzer 205 next provides the properties of concatenation transform 407 to optimizer 209, which adds them to data table 210. This transform adds a new column N1 for the result of the concatenation operation, and consequently, optimizer 209 adds a new row 1215 for column N1 to table 210, with the operation in the row being the concatenation operation. Next come properties of calculator transform 409, which does a computation on data in column C4 and puts the result in a new column N2. Thus, as shown at 1217, optimizer 209 adds a new row 1219 to table 210 for column N2 and in this row is the calculator operation.

The last intermediate transform 117 in data flow plan 401 is column select transform 411, which simply discards columns C4 through C6. Accordingly, when flow plan analyzer 205 passes the properties of transform 411 to optimizer 209, optimizer 209 removes the rows for those columns from table 210, as shown at 1221. It should be noted at this point that the operations indicated in each row of table 1221 can be performed independently of the operations indicated in the other rows, and consequently, a thread 505 can be created for each row of table 1221, as shown at 503 in FIG. 5. Table 1221 thus contains all of the information which merge transform maker 212 requires to make merge transform 419.

Conclusion

The foregoing Detailed Description has disclosed to those skilled in the arts to which their invention pertains how to make and use the inventor's techniques for optimizing data flow plans and has also disclosed the best mode presently known to the inventors for implementing their techniques. It will, however, be immediately apparent to those skilled in the arts to which the invention pertains that there are many other ways of optimizing data flow plans according to the principles disclosed herein. For example, the preferred embodiment is implemented in the Sagent transformation system and optimizes the transforms employed in that system. The techniques can, however, be employed in any data transformation system where the transformation is divided into discrete operations performed on columns of the data being transformed, and the transforms of the data flow plan may accordingly be specified as a sequence of commands, macros, or function invocations, with or without a graphical representation of the data flow plan. Of course, the specific details of the transforms used in a given data transformation system will affect the kinds and amounts of optimization that can be done.

Similarly, the preferred embodiment disclosed herein does read/write optimization where the data source or sink is a relational database system and performs the optimization by replacing a simple read or write transform and one or more optimizable transforms with an optimized transform that is a SQL query that specifies the operations performed by the optimizable transforms. The general technique of read/write optimization can, however, by applied in any situation where the data source or sink can perform operations on the data of the kinds specified in transforms. What operations can be optimized and how the optimized transform is made will of course depend on the capabilities and interfaces of the data source or sink with which it is to be used.

With merge optimization, the implementation will depend on the capabilities of the data flow plan execution engine with regard to the kinds of operations it can perform and the degree to which it can in fact perform operations in parallel. Of course there may be optimizations other than merge optimization and read/write optimization that have the same effect, namely to reduce the number of transforms in a data flow plan and/or to increase the efficiency with which the operations specified in the data flow plan are performed.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. An optimizer for a data flow plan comprising:
   a data flow plan analyzer, the data flow plan analyzer operating on the data flow plan, the data flow plan being a user-specified sequence of transforms that describe a transformation of data read from a source data repository in a first form into a second form in which the data can be written to a sink data repository that is distinct from the source data repository, each transform specifying an operation on the data, and the data flow plan analyzer determining whether the sequence of transforms includes a plurality of transforms that are optimizable transforms; and
   a transform optimizer that produces an optimized data flow plan in which one or more optimized transforms that specify operations equivalent to those specified in the plurality of optimizable transforms replaces the plurality of optimizable transforms, there being fewer of the optimized transforms than of the optimizable transforms.

2. The optimizer set forth in claim 1 wherein:
the data flow plan analyzer further reorders the transforms to increase the number of optimizable transforms.

3. The optimizer set forth in claim 1 wherein:
the optimizer is part of a data transformation system that includes a user interface in which a visual representation of the sequence of transforms appears; and
the user interface continues to display the visual representation of the data flow plan after production of the optimized data flow plan.

4. The optimizer set forth in any of claims 1 through 3 wherein:
the transforms include a read transform that reads the data from the source and a write transform that writes the transformed data to the sink;
the source permits operations to be performed on data read therefrom or the sink permits operations to be performed on data written thereto; and
the optimized transforms include a read transform or a write transform that specifies that the source or sink perform operations on the data that are equivalent to those specified in the plurality of optimizable transforms.

5. The optimizer set forth in claim 4 wherein:
the source or the sink is a relational database system; and
the optimized read transform or the optimized write transform is an SQL query.

6. The optimizer set forth in claim 4 wherein:
the transform optimizer further comprises a table, the transform optimizer receiving properties of optimizable transforms from the data flow plan analyzer, placing the properties in the table, and using the properties in the table to produce the optimized transforms.

7. The optimizer set forth in any of claims 1 through 3 wherein:
the equivalent operations specified in the one or more optimized transforms are specified such that the equivalent operations may be performed in parallel.

8. The optimizer set forth in claim 7 wherein:
the transform optimizer further comprises a table, the transform optimizer receiving properties of optimizable transforms from the data flow plan analyzer, placing the properties in the table, and using the properties in the table to produce the optimized transforms.

9. A method of optimizing a data flow plan comprising the steps of:
analyzing the data flow plan, the data flow plan being a user-specified sequence of transforms that describe a transformation of data read from a source data repository in a first form into a second form in which the data can be written to a sink data repository that is distinct from the source data repository, each transform specifying an operation on the data, and the analysis determining whether the sequence of transforms includes a plurality of transforms that are optimizable transforms; and
producing an optimized data flow plan in which one or more optimized transforms that specify operations equivalent to those specified in the plurality of optimizable transforms replaces the plurality of optimizable transforms, there being fewer of the optimized transforms than of the optimizable transforms.

10. The method set forth in claim 9 further comprising the step of:
reordering the transforms to increase the number of optimizable transforms.

11. The method set forth in claim 9 further comprising the steps of:
saving a copy of the data flow plan; and
using the copy to generate a visual representation of the sequence of transforms after the optimized data flow plan has been produced.

12. The method set forth in any of claims 9 through 11 wherein:
the transforms include a read transform that reads the data from the source and a write transform that writes the transformed data to the sink;
the source permits operations to be performed on data read therefrom or the sink permits operations to be performed on data written thereto; and
in the step of producing the optimized data flow plan, the optimized transforms include a read transform or a write transform that specifies that the source or sink perform operations on the data that are equivalent to those specified in the plurality of optimizable transforms.

13. The method set forth in claim 12 wherein:
the source or the sink is a relational database system; and
in the step of producing the optimized data flow plan, the optimized read transform or the optimized write transform is an SQL query.

14. The method set forth in claim 12 further comprising the steps of:
placing properties of the optimizable transforms in a table; and
using the table to produce the optimized transforms.

15. The method set forth in any of claims 9 through 11 wherein:
one or more of the optimized transforms specifies the equivalent operations such that the equivalent operations may be performed in parallel.

16. The method set forth in claim 15 further comprising the steps of:
placing properties of the optimizable transforms in a table; and
using the table to produce the optimized transforms.

17. A data transformation system, the data transformation system having the improvement comprising:
an optimizer that automatically produces an optimized data flow plan from a user-specified data flow plan that transforms data read from a source data repository in a first form into a second form in which the data can be written to a sink data repository that is distinct from the source data repository, the data flow plan being a first sequence of transforms, each of which specifies an operation on the data, and the optimized data flow plan being a second optimized sequence of transforms in which one or more optimized transforms replace transforms in the first sequence, the optimized sequence being equivalent to but having fewer transforms than the first sequence.

18. The data transformation system set forth in claim 17 further comprising:
a user interface that displays a visual representation of the data flow plan, the user interface continuing to display the visual representation of the data flow plan after production of the optimized data flow plan.

19. The data transformation system set forth in claim 17 or claim 18 wherein:
the transforms include a read transform that reads the data from the source and a write transform that writes the transformed data to the sink;

the source permits operations to be performed on data read therefrom or the sink permits operations to be performed on data written thereto; and the optimized data flow plan includes a read transform or a write transform that replaces a plurality of transforms in the data flow plan, the read transform or write transform specifying that operations equivalent to the operations of the replaced transforms be performed in the source or the sink.

20. The data transformation system set forth in claim 17 or claim 18 wherein:

the optimized data flow plan includes a merge transform that replaces a plurality of transforms in the data flow plan, the merge transform specifying operations equivalent to the operations of the replaced transforms.

21. The data transformation system set forth in claim 20 wherein:

the merge transform further specifies the equivalent operations such that the equivalent operations may be performed in parallel.

22. A data storage device, the data storage device being characterized in that:

the data storage device contains code which when executed in a computer implements an optimizer for a data flow plan, the optimizer comprising a data flow plan analyzer, the data flow plan analyzer operating on the data flow plan, the data flow plan being a user-specified sequence of transforms that describe a transformation of data read from a source data repository in a first form into a second form in which the data can be written to a sink data repository that is distinct from the source data repository, each transform specifying an operation on the data, and the data flow plan analyzer determining whether the sequence of transforms includes a plurality of transforms that are optimizable transforms; and a transform optimizer that produces an optimized data flow plan in which one or more optimized transforms that specify operations equivalent to those specified in the plurality of optimizable transforms replaces the plurality of optimizable transforms, there being fewer or the optimized transforms than of the optimizable transforms.

23. The data storage device set forth in claim 22 further characterized in that:

the data flow plan analyzer further reorders the transforms to increase the number of optimizable transforms.

24. The data storage device set forth in claim 22 further characterized in that:

the optimizer is part of a data transformation system that includes a user interface in which a visual representation of the sequence of transforms appears; and the user interface continues to display the visual representation of the data flow plan after production of the optimized data flow plan.

25. The data storage device set forth in claim 22 further characterized in that:

the transforms include a read transform that reads the data from the source and a write transform that writes the transformed data to the sink;

the source permits operations to be performed on data read therefrom or the sink permits operations to be performed on data written thereto; and the optimized transforms include a read transform or a write transform that specifies that the source or sink perform operations on the data that are equivalent to those specified in the plurality of optimizable transforms.

26. The data storage device set forth in claim 25 further characterized in that:

the source or the sink is a relational database system; and the optimized read transform or the optimized write transform is an SQL query.

27. The data storage device set forth in claim 25 further characterized in that:

the transform optimizer further comprises a table, the transform optimizer receiving properties of optimizable transforms from the data flow plan analyzer, placing the properties in the table, and using the properties in the table to produce the optimized transforms.

28. The data storage device set forth in claim 22 further characterized in that:

the equivalent operations specified in the one or more optimized transform are specified such that the equivalent operations may be performed in parallel.

29. The data storage device set forth in claim 28 further characterized in that:

the transform optimizer further comprises a table, the transform optimizer receiving properties of optimizable transforms from the data flow plan analyzer, placing the properties in the table, and using the properties in the table to produce the optimized transforms.

30. A data storage device, the data storage device being characterized in that:

the data storage device contains code which when executed in a computer implements a method of optimizing a data flow plan comprising the steps of analyzing the data flow plan, the data flow plan being a user-specified sequence of transforms that describe a transformation of data read from a source data repository in a first form into a second form in which the data can be written to a sink data repository that is distinct from the source data repository, each transform specifying an operation on the data, and the analysis determining whether the sequence of transforms includes a plurality of transforms that are optimizable transforms; and producing an optimized data flow plan in which one or more optimized transforms that specify operations equivalent to those specified in the plurality of optimizable transforms replaces the plurality of optimizable transforms, there being fewer of the optimized transforms than of the optimizable transforms.

31. The data storage device set forth in claim 30 further characterized in that:

the method further comprises the step of reordering the transforms to increase the number of optimizable transforms.

32. The data storage device set forth in claim 30 further characterized in that:

the method further comprising the steps of saving a copy of the data flow plan; and using the copy to generate a visual representation of the sequence of transforms after the optimized data flow plan has been produced.

33. The data storage device set forth in claim 30 further characterized in that:

the transforms include a read transform that reads the data from the source and a write transform that writes the transformed data to the sink;

the source permits operations to be performed on data read therefrom or the sink permits operations to be performed on data written thereto; and in the step of producing the optimized data flow plan, the optimized transforms include a read transform or a write transform that specifies that the source or sink perform operations on the data that are equivalent to those specified in the plurality of optimizable transforms.

34. The data storage device set forth in claim 33 further characterized in that:

the source or the sink is a relational database system; and in the step of producing the optimized data flow plan, the optimized read transform or the optimized write transform is an SQL query.

35. The data storage device set forth in claim 34 further characterized in that:

the method further comprises the steps of:
placing properties of the optimizable transforms in a table; and
using the table to produce the optimized transforms.

36. The data storage device set forth in claim 30 further characterized in that:

one or more of the optimized transforms specifies the equivalent operations such that the equivalent operations may be performed in parallel.

37. The data storage device set forth in claim 36 further characterized in that:

the method further comprises the steps of:
placing properties of the optimizable transforms in a table; and
using the table to produce the optimized transforms.

38. A data storage device, the data storage device being characterized in that:

the data storage device contains code which when executed in a computer implements a data transformation system, the data transformation system having the improvement comprising an optimizer that automatically produces an optimized data flow plan from a user-specified data flow plan that transforms data read from a source data repository in a first form into a second form in which the data can be written to a sink data repository that is distinct from the source data repository, the data flow plan being a first sequence of transforms, each of which specifies an operation on the data, and the optimized data flow plan being a second optimized sequence of transforms in which one or more optimized transforms replace transforms in the first sequence, the optimized sequence being equivalent to but having fewer transforms than the first sequence.

39. The data storage device set forth in claim 38 further characterized in that:

the data transformation system further comprises
a user interface that displays a visual representation of the data flow plan, the user interface continuing to display the visual representation of the data flow plan after production of the optimized data flow plan.

40. The data storage device set forth in claim 38 further characterized in that:

the transforms include a read transform that reads the data from the source and a write transform that writes the transformed data to the sink;

the source permits operations to be performed on data read therefrom or the sink permits operations to be performed on data written thereto; and the optimized data flow plan includes a read transform or a write transform that replaces a plurality of transforms in the data flow plan, the read transform or write transform specifying that operations equivalent to the operations of the replaced transforms be performed in the source or the sink.

41. The data storage device set forth in claim 38 further characterized in that:

the optimized data flow plan includes a merge transform that replaces a plurality of transforms in the data flow plan, the merge transform specifying operations equivalent to the operations of the replaced transforms.

42. The data storage device set forth in claim 41 further characterized in that:

the merge transform further specifies the equivalent operations such that the equivalent operations may be performed in parallel.

* * * * *